(No Model.)
T. R. BETZEL.
BUTTON HOOK.
No. 413,314.        Patented Oct. 22, 1889.
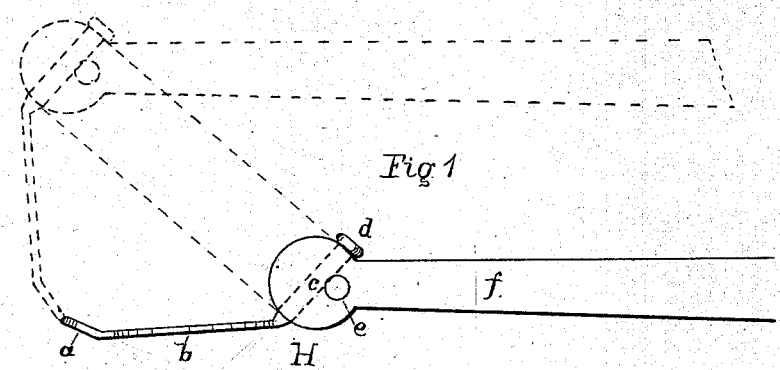
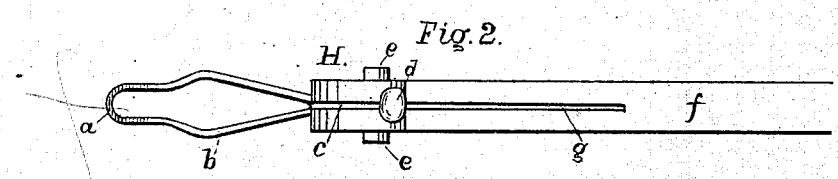
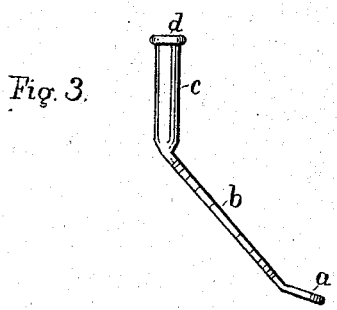 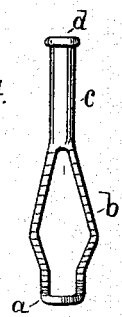
WITNESSES:
George M. Phelps
Caroline E. Davidson
INVENTOR
Theodore R. Betzel
BY
Pope Edgecomb & Terry
ATTORNEYS.

UNITED STATES PATENT OFFICE.

THEODORE R. BETZEL, OF NEW YORK, N. Y.

BUTTON-HOOK.

SPECIFICATION forming part of Letters Patent No. 413,314, dated October 22, 1889.

Application filed May 25, 1889. Serial No. 312,156. (No model.)

*To all whom it may concern:*

Be it known that I, THEODORE R. BETZEL, a citizen of the United States, residing in New York, in the county and State of New York, have invented certain new and useful Improvements in Button-Hooks, of which the following is a specification.

The invention relates to the class of button-hooks in which a swivel is formed by the combination of the handle and the hook.

The invention will be readily understood by inspection of the accompanying drawings, in which—

Figure 1 is a side view of the buttoner, showing in dotted lines the position of the parts after being turned partly round in the act of buttoning. Fig. 2 is a top view. Figs. 3 and 4 show the hook.

The handle $f$ is preferably split at the end, as shown at $g$, and a hole is made diagonally through the end, which receives the shank $c$ of the hook which forms the pinion of the swivel. The handle may be then compressed upon the pinion by the rivet $e$. The hook $a\ b\ c\ d$ is made, preferably, in the form of a loop, though this is not necessary, as if the end forms a hook only it can be used nearly as well. The hook portion $a\ b$ is bent at an angle from the swivel portion $c$, and this is essential to the best working of the hook. The end $a$ is also preferably bent at an angle from the portion $b$, but this is not so necessary. The enlarged head $d$ of the portion $c$ prevents the hook from slipping out of the handle.

In operation the hook is passed through the button-hole and placed over the button in the usual manner, the part $a$ being large enough to admit the shank of the button, but not large enough to let the head slip through. The button thus being engaged by the hook, a turning of the handle in either direction will bring the button into the button-hole with the greatest facility and with the least possible strain upon either the button or the button-hole.

I claim as my invention—

1. The combination of the handle $f$, the hook consisting of the part $c$, passing diagonally through the handle and at an angle therewith, and the part $a\ b$, bent at an angle to the part $c$.

2. The combination of the split handle $f$, the rivet $e$, and the hook which consists of the part $c$, passing diagonally through the handle, and the parts $a\ b$, the part $b$ being bent at an angle to part $c$, and part $a$ bent at an angle to part $b$.

In testimony whereof I have hereunto subscribed my name this 24th day of May, A. D. 1889.

THEODORE R. BETZEL.

Witnesses:
 GEORGE M. PHELPS,
 CAROLINE E. DAVIDSON.